(12) United States Patent
Johnson

(10) Patent No.: US 9,840,893 B2
(45) Date of Patent: Dec. 12, 2017

(54) INSPECTION METHODS FOR REPROCESSING NON-METALLIC OILFIELD TOOLS

(71) Applicant: TRC Services, Inc., The Woodlands, TX (US)

(72) Inventor: Donald Mike Johnson, The Woodlands, TX (US)

(73) Assignee: TRC Services, Inc., The Woodlands, TX (US)

( * ) Notice: Subject to any disclaimer, the term of this patent is extended or adjusted under 35 U.S.C. 154(b) by 494 days.

(21) Appl. No.: 14/338,044

(22) Filed: Jul. 22, 2014

(65) Prior Publication Data

US 2015/0021017 A1    Jan. 22, 2015

Related U.S. Application Data

(60) Provisional application No. 61/856,968, filed on Jul. 22, 2013.

(51) Int. Cl.
*E21B 41/00* (2006.01)
*G01M 99/00* (2011.01)
*E21B 17/00* (2006.01)

(52) U.S. Cl.
CPC ........... *E21B 41/00* (2013.01); *G01M 99/007* (2013.01); *E21B 17/00* (2013.01)

(58) Field of Classification Search
CPC ....... E21B 41/00; E21B 17/00; G01M 99/007
See application file for complete search history.

(56) References Cited

U.S. PATENT DOCUMENTS

| | | | | |
|---|---|---|---|---|
| 2,245,269 A * | 6/1941 | Gilbert | ..................... | G01N 3/32 374/47 |
| 3,958,049 A * | 5/1976 | Payne | ................... | E21B 17/006 166/176 |
| 4,700,577 A * | 10/1987 | Tripp | ........................ | G01N 3/08 73/789 |
| 5,253,946 A * | 10/1993 | Watkins | ................ | E21B 17/023 403/265 |
| 6,460,418 B1 * | 10/2002 | Hiyoshi | ................. | G01B 11/16 356/35.5 |
| 7,397,238 B2 | 7/2008 | Walters et al. | | |
| 7,730,938 B2 | 6/2010 | Rutledge, Sr. | | |
| 2012/0031539 A1 * | 2/2012 | Johnson | .................. | E21B 19/16 156/64 |
| 2012/0141194 A1 | 6/2012 | Rutledge, Sr. et al. | | |

\* cited by examiner

*Primary Examiner* — Robert R Raevis
(74) *Attorney, Agent, or Firm* — Ramey & Schwaller, LLP

(57) ABSTRACT

The disclosure relates to the treatment of non-metallic sucker rods, made of metal, particularly to the method of reclamation of used rods already used in the mechanical deep-pumping extraction of oil. The method of remanufacturing of standard length rods includes subjecting used non-metallic sucker rods to a destructive pull test.

19 Claims, 1 Drawing Sheet

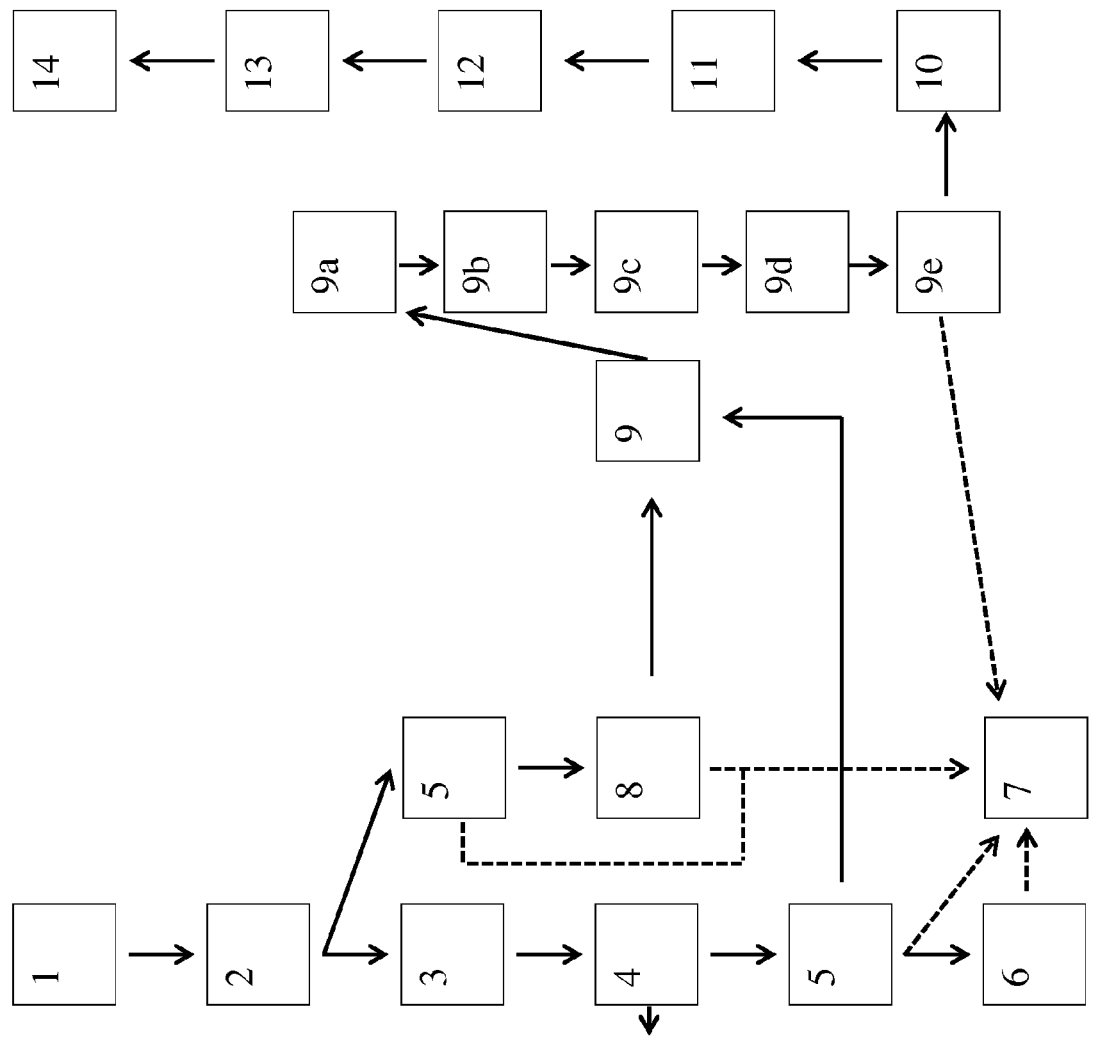

INSPECTION METHODS FOR REPROCESSING NON-METALLIC OILFIELD TOOLS

FIELD

The embodiments of the invention disclosed herein relate to the recovery or remanufacturing of oilfield equipment. More specifically, the embodiments of the invention disclosed herein relate to the inspection of rods such as sucker rods and pony rods used in pump wells in oil fields.

BACKGROUND

In the oilfield industry, many wells use a downhole reciprocating type production pump to lift oil from a borehole to the surface. Rods extend from the surface to the extraction area to enable a pump jack located at the surface to cause reciprocal movement of the rod and bring oil to the surface. These rods are known as sucker rods or pump rods and are typically between 25 and 40 feet in length, and threaded at both ends. Sometimes the sucker rods are made of fiberglass with metal end fittings and are typically 37.5 feet in length.

For various reasons, such as wear and tear, the sucker rods must be removed and replaced from time to time. Typically, upon removal, the metal sucker rod is subjected to various forms of inspection, reconditioning and or remanufacturing. In this manner, a used metal sucker rod can be safely returned to service.

Typically the main process of reclaiming or reconditioning a used metal rod utilized in oil pump wells comprises obtaining the rod, cleaning the rod to remove contaminates from use in oil extraction, performing a visual inspection of the rod body, the end fitting, gauging of the end fitting, and gauging the end threads after thread coupling has been removed to determine if the rod should be reconditioned.

However, in addition to metal sucker rods which can be reconditioned or reclaimed, fiberglass reinforced plastic sucker rods exist. The manufacturing of these sucker rods is taught in various patents such as U.S. Pat. No. 7,730,938. More particularly, fiberglass reinforced plastic sucker rods typically require the use of pultrusion machines. Subsequently, the fiberglass rods are attached to metal rod ends through the use of abrading materials and adhesives to attach the metal end to the fiberglass rod.

During assembly, in certain methods, adhesive is inserted into to an end fitting, which in turn is attached to the fiberglass rod end. After attachment, the area of interaction is heated to cure the adhesive. In this method, upon subsequent cooling, the rods are then pulled in a longitudinal manner to set the bond between the cured adhesive and the end fitting. By pulling during the assembly of the sucker rod, the rod can be inspected to check the integrity of the bond between the rod and the end fitting.

While metallic sucker rods have often been reclaimed, a procedure or method beyond cleaning and visually inspecting the used composite sucker rod has not been developed for the reclamation of used composite sucker rods such as fiberglass sucker rods, despite the fact that fiberglass sucker rods are lighter in weight than their metal counterparts and provide less stress on machinery which lowers or raises the sucker rods within a borehole. There would be great utility in developing methods for inspection and reclamation of composite sucker rods such that they can be reliably used again instead of requiring new composite sucker rods in downhole operations or used composite sucker rods of unproved reliability.

SUMMARY

Certain embodiments of the invention disclosed herein pertain to a method for inspecting a used non-metallic sucker rod for re-use, the method comprising the steps of: a) obtaining a used non-metallic sucker rod having metal rod ends and a non-metallic body; b) removing contaminates from the surface of the sucker rod; c) performing a visual inspection of the metal rod ends; d) performing a visual inspection of the rod body; e) performing a non-visual inspection of metal rod ends to determine if the metal rod ends are amenable to re-use; f) performing a destructive pull test of the non-metallic body to determine if the composite body is amenable to re-use; and g) re-using the non-metallic sucker rod.

In such embodiments an unused non-metallic body has a specific elasticity parameter. In further embodiments, the destructive pull test determines the used non-metallic body has an elasticity within said parameter.

In still further embodiments of the invention disclosed herein, when contemplating removing contaminants from the sucker rod, removing contaminates from the sucker rod comprises: washing the sucker rod with an organic compound, pressure washing the sucker rod, or a combination thereof. In more specific embodiments concerning the organic compound used, the organic compound is kerosene.

In other embodiments of the invention concerning a non-visual inspection of the metal rod ends, the inspection comprises performing a magnetic flux leakage inspection.

In embodiments of the method concerning the non-metallic body of the sucker rod, the non-metallic body has a material composition comprising fiberglass, carbon fiber, carbon nanotube, nylon, Teflon or a combination thereof. In particular embodiments, the non-metallic body is fiberglass.

In embodiments concerning the destructive pull test, the pull test measures the non-metallic sucker rod with a given diameter, a density and a material composition. In such embodiments, the destructive pull test further comprises entering the diameter, the density and the material composition of the non-metallic rod body into a computer program operatively connected to a computer. Still further, in certain embodiments the destructive pull test is performed at a specified tension force. In such embodiments, the tension force is entered into the computer program. Further, in certain embodiments, the destructive pull test further comprises securing the non-metallic body at a defined distance and pulling the non-metallic body in a longitudinal direction, wherein an increase in the defined distance is entered into the computer program. Still further, in some embodiments, upon entering the diameter, the density and the material composition of the non-metallic body; the tension force of the destructive pull test; and the increase in the defined distance into the computer program, the program provides signal to a user operating the destructive pull test indicating if the used non-metallic body has an elasticity within the specified parameter.

In such embodiments concerning the signal, the signal is a numeric signal produced by a graphical user interface or a printer, or a sound. In such instances, if the signal indicates that the non-metallic body is not within the specified parameter, the non-metallic body is discarded. Likewise, if the signal indicates that the non-metallic body is within the specified parameter, the non-metallic body is reassembled with the metal rod ends if the metal rod ends have passed non-visual inspection.

BRIEF DESCRIPTION OF THE DRAWINGS

In order that the manner in which the above-recited and other enhancements and objects of the invention are obtained, we briefly describe a more particular description of the invention briefly rendered by reference to specific embodiments thereof which are illustrated in the appended drawings. Understanding that these drawings depict only typical embodiments of the invention and are therefore not to be considered limiting of its scope, we herein describe the invention with additional specificity and detail through the use of the accompanying drawings in which:

FIG. 1 is a flow chart of the composite rod reclamation process with solid arrows illustrating the flow of the process and dashed arrows illustrating points at which failed components are discarded.

LIST OF REFERENCE NUMERALS 1 collection site
2 cleaning process
3 metallic inspection
4 non-metallic inspection
5 visual inspection
6 non-visual inspection
7 discarded
8 non-metallic rod portion non visual inspection
9 destructive pull testing
9a computer program entry
9b rod securement
9c pull testing
9d tension force detection
9e distance reading
10 end marking
11 measurement
12 painting
13 final inspection
14 re-use

DETAILED DESCRIPTION

We show the particulars shown herein by way of example and for purposes of illustrative discussion of the preferred embodiments of the present invention only. We present these particulars to provide what we believe to be the most useful and readily understood description of the principles and conceptual aspects of various embodiments of the invention. In this regard, we make no attempt to show structural details of the invention in more detail than is necessary for the fundamental understanding of the invention. We intend that the description should be taken with the drawings. This should make apparent to those skilled in the art how the several forms of the invention are embodied in practice.

We mean and intend that the following definitions and explanations are controlling in any future construction unless clearly and unambiguously modified in the following examples or when application of the meaning renders any construction meaningless or essentially meaningless. In cases where the construction of the term would render it meaningless or essentially meaningless, we intend that the definition should be taken from Webster's Dictionary $3^{rd}$ Edition.

As used herein, the term "sorting" means to arrange according to class, kind, and/or size; to classify.

As used herein, the term "rod" includes hollow or solid rods, continuous rods or joints, and includes welded, flanged, screwed, and other rod goods. In particular, sucker rod joints are one type of rod which benefits from the methods described herein, but the disclosure is not so limited.

As used herein, the term "used rod" means a rod that has been in actual service for a purpose, such as transporting fluids, connecting a downhole pump to a surface driver, and the like, whether on the surface, downhole, underwater, on-shore, or off-shore. In particular, in the case of sucker rods, used sucker rods are those that can be lifted to a holding area where they are uniquely identified according to size, quantity, company name and well location and tagged appropriately.

As used herein the phrase "performing non-visual, non-destructive inspection" means a technique which does not impair the rods from performing their intended function or use, and does not involve a human visual test.

Embodiments of the invention concern the inspection of composite and other non-metallic sucker rods. In certain embodiments, the rods are fiberglass, in other embodiments, the rods comprise plastic. In further embodiments, the rods comprise composites such as carbon fibers. In other embodiments, the rods comprise composites such as carbon nanotube fibers. In still further embodiments, the rods comprise composites such as metal filaments, metal wires or metal scaffolding within polymers. In other embodiments, the rods comprise Teflon®. In further embodiments, the rods comprise nylon.

Certain embodiments of the invention disclosed herein concern cleaning the sucker rods. In such embodiments, typically the rods are cleaned before inspection to sort out unacceptable rods from rods which are able to function for their intended purpose. In specific embodiments of the invention, the used rods are cleaned in a hot kerosene bath to remove paraffin, grease and other foreign materials.

In other embodiments, the cleaning process subjects the rods to pressure washing, either with water or with other solvents such as inorganic solvents such as acid baths and the like or organic solvents. Organic solvents used in cleaning processes include benzene, ether, gasoline, acetone and the like. In some embodiments, in lieu of dipping the rods in the organic or inorganic solvents, the rods are pressure washed or blasted with the solvents. In other embodiments, the rods are cleaned by subjecting the rods to low pressure wetting.

In still other embodiments concerning cleaning of the rods, high pressure air, high pressure inert gases such as nitrogen, are used to clean the rods of paraffin, grease and other foreign materials. In still further embodiments, the gasses are reactive gasses such as methane, oxygen, chlorine, fluorine and the like. In certain embodiments, the reactive gasses are hydrocarbon gasses extracted at a well site. In still further embodiments, the rods are cleaned with cryogenic materials such as dry ice, liquid nitrogen, liquid ethane and the like.

In certain further embodiments, the metal ends will be subjected to impact or vibrations, the non-metallic rod will be subjected to impact or vibrations or both will be subjected to impact or vibrations.

Once the rods are clean typically in most embodiments of the invention, they are subjected to inspection.

In certain embodiments regarding inspection, rods are collected from petroleum producing sites and brought to a central location for inspection prior to any reconditioning or remanufacturing processes. In such embodiments, the rods first undergo cleaning and then visual inspection.

Typically, the process of visual inspection typically involves a person visually locating pitting, corrosion, wear, manufacturing defects and manufacturing flaws. Any rod which fails to pass this visual inspection is removed from the aforementioned central location as rejected. However, despite visual inspection, end fittings may have unseen defects such as cracks that result in such rods being unacceptable for their intended use. Accordingly, sometimes other methods of inspection are used.

The metallic rod ends, in certain embodiments are inspected. In embodiments wherein the threads are inspected, the metallic rod ends are inspected visually. This can be via magnetic particle inspection, ultrasonic inspection, microscopically, optically, with density based measurements, with tests for physical strength of the threads or a combination thereof. In specific embodiments, the inspection is designed to detect cracks in the end fitting and threads, corrosion in the threading, erosion of the threading, cross-threads in the threading, and other similar flaws in the threads. In further embodiments, the inspection is designed to gauge the outside diameter of the end fittings. In this embodiment, the inspection is designed to make certain that the steel has not gone from the elastic phase to plastic during its downhole use.

In embodiments of the invention concerning inspection of metal rod ends, non-visual inspection, magnetic flux leakage inspection are types of useful non-visual inspections. Such methods typically involve the use of a magnetic coil and a detector assembly for inspecting the rod ends. Methods specifically pertaining to magnetic flux leakage inspection are found in U.S. Pat. No. 7,397,238, which is herein incorporated by reference in its entirety. In alternative embodiments of the invention, other suitable non-visual, non-destructive inspections include, but are not limited to: ultrasonic inspection, eddy current inspection, acoustic emission inspection, and the like. Furthermore, the data from such tests, in certain embodiments, are presented in one or more formats, including visual format, such as on a CRT screen, flat panel screen, printer, strip chart recorder and the like.

In further embodiments concerning inspection upon receiving the used and disassembled sucker rods, the body of the fiberglass rod, plastic rod, carbon fiber rod, or the like as described above is inspected. In certain embodiments, the rod is inspected for cuts. In other embodiments, the rod is inspected for manufacturing flaws that would result in failure when the rod is under stress. In further embodiments, the rod is inspected for service induced flaws which occur when the rod has been used in downhole operations.

While new sucker rods have been known to undergo quality control tests both in formation as found in U.S. patent application Ser. No. 13/169,246 and in fitting a rod end to a rod body at a coupling location as found in U.S. patent application Ser. No. 13/371,131, composite and plastic sucker rods as described above are not typically reclaimed. However, in the embodiments of the invention disclosed herein, the inventors have found new methods of reclaiming said non-metallic and plastic sucker rods through inspection and testing. In specific embodiments, the methods concern non-metallic sucker rods.

In certain embodiments, upon cleaning, and optical inspection, those non-metallic sucker rods which do not have corrosion, erosion, cracks or other damage of their ends which couple to metal rod ends are subject to testing to ensure that they still fall within specifications for use in downhole applications as the non-metallic sucker rods will have some change in length, density and composition due to corrosive, abrasive high temperature or high pressure environments found in downhole operations. It is important to ensure that the sucker rods do not break and result in time consuming repairs to allow extraction of oil and other petrochemicals from the wellbore to continue. As such, the non-metallic sucker rods can be removed from time to time for cleaning, inspection and testing to ensure that they do not need to be replaced.

In specific embodiments, each rod body undergoes a destructive pull test. In such embodiments, the rod is placed into a mechanism for pulling the rods in a longitudinal manner. In certain embodiments, the device is manually operated such as with a hand crank mechanism. In other embodiments, the device is operated hydraulically, electrically, pneumatically and the like without human strength. In embodiments where in a pulling mechanism is employed, the rod is retained by a pull tester coupling. With more particularity, nubbins are attached to the end of the rods and are retained by the pull tester. Still further, in certain embodiments the pull tester couplings abut one another before pulling. In such embodiments, a small fraction of the sucker rod is pull tested. In other embodiments, the pull tester couplings are spaced apart from one another. As is apparent in this description, any length or section of the sucker rod can be tested by configuration of each pull tester coupling relative to the other pull tester coupling along any section of the sucker rod body.

During the pull test, the rod undergoes stretching depending on the tension force applied, the type of rod composition—such as a stronger polymer in a fiberglass rod, the diameter of the sucker rod, the length of the sucker rod and so on. In specific embodiments, optical measurement such as laser distance measurement is employed to determine the distance of movement of the two pull clamps during the pull test. In still further embodiments, the tension force is determined electronically or mechanically with employment of the pulling mechanism. In specific embodiments, the tension force is determined electronically and presented to the operator via a graphical user interface by way of computer. The computer can be a circuit board integrated into the pulling mechanism or can be a standalone computer operatively connected to the pulling mechanism. Optionally, in certain embodiments, the computer is connected to a storage device to store information regarding the distance of movement of the pull clamps in the pull test. In this embodiment, the pull test results for each sucker rod can be recorded for future reference.

In evaluating the pull test, rods that stretch beyond specifications will be discarded as being too weak to support the longitudinal pull the sucker rod is subjected to in downhole operations. Rods that stretch below specifications will be discarded as being too brittle to withstand flexing of the rod in downhole operations.

In the process of pulling the sucker rods by clamps at the metal rod ends. However, during the destructive pull test, the metal rod ends are pulled relative to the fiberglass sucker rod. Because of this, the glue or other adhesive material such as epoxy resin connecting the fiberglass sucker rods to the metal rod ends can become brittle or dislodged. Accordingly, in certain instances during the pull there is an increase in the distance between the fiberglass sucker rod ends which are inserted into the metal rod ends and the metal rod ends themselves.

In such embodiments, it becomes necessary to ensure that there is no weakening or failure of the fiberglass rod ends to be secured into the metal rod ends. In order to ensure there is no failure at this stage of the pull test, measurement of any increase in distance must take place. In certain embodiments, the location of the fiberglass sucker rod where it meets the metal rod ends is marked with a marker, a paint, an abrasion and the like.

Upon conducting the destructive pull test, the fiberglass rod ends are measured relative to the metal rod ends. In this embodiment, the measurement can take place using a variety of instruments. In certain instances, the measurement is manual and uses a ruler. In other instances, the measurement is manual or mechanical and a caliper is used to determine the movement of the metal rod end relative to the fiberglass sucker rod end. In still other embodiments, the measurement is a laser measurement that determines the movement if any between the fiberglass rod ends and the metal rod ends.

Upon testing, the sucker rods which have not been discarded are prepared for reassembly and re-use.

Upon completion of the inspection and destructive pull test, and in many embodiments, upon completion of the reassembly, the sucker rods are subjected to one or more non-destructive tests. In certain embodiments the non-destructive test is x-ray imaging. In certain embodiments, the non-destructive test is acoustic imaging. However, all non-visual non-destructive inspection is contemplated.

Implementation

In implementation of the aforementioned embodiments and methods, and referring to FIG. 1, non-metallic rods used as sucker rods and the like, are removed from wellbores and transported to a collection site 1, located at the upstream petroleum producing site or at a common location via shipment.

Upon arrival at the collection site 1, the rods are subjected to a cleaning process 2. In the cleaning process, the rods are cleaned in a hot kerosene bath to remove paraffin, grease and other foreign materials. Further in the cleaning process the rods are often subjected to pressure washing with water, organic solvents, cryogenic liquids or dry ice to remove additional paraffin, grease, other residue and kerosene from the rods.

The metal rod ends are subjected to metallic inspection 3 and the non-metallic rod portions are subjected to non-metallic inspection 4.

The metal rod ends undergo end piece inspection to determine if they are fit for reconditioning. First, the end pieces are subjected to visual inspection 5. After visual inspection, the metal rod ends are subjected to non-visual inspection 6. In this embodiment, the end pieces are subjected to magnetic flux leakage inspection. This involves the use of a magnetic coil and a detector assembly for inspecting the end pieces to sort out flaws in the metal. Failure of the magnetic end pieces by either visual inspection 5 or non-visual inspection 6 results in the rod being discarded 7.

The non-metallic rod portions first undergo visual inspection 5 to determine if there are any noticeable cracks, pitting, manufacturing or service induced defects. Those rods with noticeable cracks and pitting are discarded 7.

The non-metallic rod portions are then subjected to non-metallic rod portion non-visual inspection 8 involving ultrasonic inspection, acoustic emission inspection or x-ray inspection. The rods with cracks which fail the non-visual inspection are discarded 7.

Following the non-metallic rod portion non-visual inspection 8, the rods are subjected to destructive pull testing 9 to determine if the rods are still within specifications of the manufacturers for use in downwhole applications as the non-metallic rods will have some minor change in length, density and composition due to the corrosive, abrasive and high temperature environments found in downwhole applications. First, the type of non-metallic rod, the diameter, and the density are subjected to computer program entry 9a via entry of parameters into a computer program connected to a computer processor.

Next, the rods with nubbins are subjected to rod securement 9b with two sets of clamps. The rods are then subjected to test pulling 9c wherein they are pulled in a longitudinal manner. The tension force is determined electronically via tension force detection 9d and entered into the computer through the computer program. The distance the rods are able to be pulled in a longitudinal manner via a distance reading 9e is also entered into the computer through the computer program.

The computer program determines the distance the rods of a given composition, density and diameter should be able to be pulled with a given tension force. If the distance pulled is insufficiently short or insufficiently long, the rods are discarded 7.

Prior to subjecting the rods to the destructive pull test, the rods are subjected to end marking at the location of the junction between the fiberglass ends and the metal rod ends 10. Any difference between the marked location prior to the destructive pull test and subsequent to the pull test is measured 11 to determine if the sucker rods are still in compliance.

Upon testing, the non-metallic rods undergo painting 12 to prevent chemical and abrasive damage.

As a final step, the rods are subjected to final inspection 13 by visual inspection or x-ray imaging to ensure that there are no cracks or other damage from the reassembly process. Upon inspection, the assembled rods are ready for re-use 14.

From the foregoing description, one of ordinary skill in the art can easily ascertain the essential characteristics of this disclosure, and without departing from the spirit and scope thereof, can make various changes and modifications to adapt the disclosure to various usages and conditions. For example, we do not mean for references such as above, below, left, right, and the like to be limiting but rather as a guide for orientation of the referenced element to another element. A person of skill in the art should understand that certain of the above-described structures, functions, and operations of the above-described embodiments are not necessary to practice the present disclosure and are included in the description simply for completeness of an exemplary embodiment or embodiments. In addition, a person of skill in the art should understand that specific structures, functions, and operations set forth in the above-described referenced patents and publications can be practiced in conjunction with the present disclosure, but they are not essential to its practice.

The invention can be embodied in other specific forms without departing from its spirit or essential characteristics. A person of skill in the art should consider the described embodiments in all respects only as illustrative and not restrictive. The scope of the invention is, therefore, indicated by the appended claims rather than by the foregoing description. A person of skill in the art should embrace, within their scope, all changes to the claims which come within the meaning and range of equivalency of the claims. Further, we hereby incorporate by reference, as if presented in their entirety, all published documents, patents, and applications mentioned herein.

REFERENCES

U.S. Pat. No. 3,958,049
U.S. Pat. App. Pub. No. US20120031539

The invention claimed is:

1. A method of inspecting and re-using a used non-metallic sucker rod, the method comprising the steps of:
   a. obtaining a used non-metallic sucker rod having metal rod ends and a non-metallic body;
   b. removing contaminates from the surface of the sucker rod;
   c. performing a visual inspection of the metal rod ends;
   d. performing a visual inspection of the non-metallic body;
   e. performing a non-visual inspection of the metal rod ends to determine if the metal rod ends are amenable to re-use;
   f. marking an interface between a junction of the rod body and the metal rod end;
   g. performing a destructive pull test of the non-metallic body to determine if the sucker rod is amenable to re-use; wherein an unused non-metallic body has a specified parameter and wherein the destructive pull test determines whether the used non-metallic body has a parameter within said specified parameter;
   h. measuring any increase in distance in the interface between the junction of the rod body and the metal rod end to determine if the distance is still in compliance; and
   i. determining that the sucker rod has passed all inspection criteria in steps a to h, and subsequently re-using the non-metallic sucker rod.

2. The method of claim 1, wherein removing contaminates from the sucker rod comprises: washing the sucker rod with an organic compound, pressure washing the sucker rod, or a combination thereof.

3. The method of claim 2, wherein the organic compound is kerosene.

4. The method of claim 1, wherein performing a non-visual inspection of the metal rod ends comprises performing a magnetic flux leakage inspection.

5. The method of claim 1, wherein the non-metallic body has a material composition comprising fiberglass, carbon fiber, carbon nanotube, nylon, Teflon or a combination thereof.

6. The method of claim 5, wherein the non-metallic body is fiberglass.

7. The method of claim 5, wherein the non-metallic body has a diameter, a density and a material composition.

8. The method of claim 7, wherein the destructive pull test further comprises entering the diameter, the density and the material composition of the non-metallic rod body into a computer program operatively connected to a computer.

9. The method of claim 8, wherein the destructive pull test is performed at a specified tension force.

10. The method of claim 9, wherein the tension force is entered into the computer program.

11. The method of claim 10, wherein the destructive pull test further comprises securing the non-metallic body with a pair of pull tester couplings at a defined distance and pulling the non-metallic body with the pair of pull tester couplings in a longitudinal direction, wherein an increase in the defined distance is entered into the computer program.

12. The method of claim 11, wherein upon entering the diameter, the density and the material composition of the non-metallic body; the tension force of the destructive pull test; and the increase in the defined distance into the computer program, the program provides signal to a user operating the destructive pull test indicating if the used non-metallic body has an elasticity within the specified parameter.

13. The method of claim 12, wherein the signal is a numeric signal produced by a graphical user interface or a printer, or a sound.

14. The method of claim 13, wherein if the signal indicates that the non-metallic body is not within the specified parameter, the non-metallic body is discarded.

15. The method of claim 13, wherein if the signal indicates that the non-metallic body is within the specified parameter, the non-metallic body is reassembled with the metal rod ends if the metal rod ends have passed non-visual inspection.

16. The method of claim 1, wherein the interface is marked at one junction between the rod body and the metal rod end.

17. The method of claim 1, wherein two interfaces are marked, at a junction at each end of the rod body connected to each metal rod end.

18. The method of claim 1, wherein the measurement is manual and conducted with a caliper.

19. The method of claim 1, wherein the measurement is electronic and conducted with a laser.

* * * * *